United States Patent [19]

Kim

[11] Patent Number: 5,739,985
[45] Date of Patent: Apr. 14, 1998

[54] HEAD DRUM ASSEMBLY

[75] Inventor: Keum-Mo Kim, Seoul, Rep. of Korea

[73] Assignee: Daewoo Electronics Co., Ltd., Seoul, Rep. of Korea

[21] Appl. No.: 774,441

[22] Filed: Dec. 30, 1996

[30] Foreign Application Priority Data

Dec. 29, 1995 [KR] Rep. of Korea ............... 95-51410 U

[51] Int. Cl.[6] .............................................. G11B 15/61
[52] U.S. Cl. .............................................. 360/107
[58] Field of Search ........................ 360/107, 108, 360/84, 85

[56] References Cited

U.S. PATENT DOCUMENTS 4,930,030  5/1990  Yabu et al. ............ 360/107
4,972,283  11/1990  Kim ...................... 360/107
5,363,263  11/1994  Ohji et al. ............. 360/108
5,392,180  2/1995  Hasegawa ............... 360/107

Primary Examiner—Robert S. Tupper

[57] ABSTRACT

A head drum assembly has an upper drum having at least two video heads at an outer bottom portion thereof, and a rotor transformer at an inner bottom portion of the upper drum. A lower drum is formed on a boss and has a cylindrical shape with the same diameter as that of the upper drum. The lower drum is positioned under the upper drum. The boss is formed by bending a deck upwardly. A lead line for leading a magnetic tape is formed on the outer periphery of the lower drum. A stator transformer corresponding to the rotor transformer is positioned on a main PCB. A shaft is integrally formed on a main chassis and is installed in the center portion of the upper drum. A motor for rotating the upper drum relative to the shaft is provided. The manufacturing and the structure of the head drum assembly is simple.

15 Claims, 4 Drawing Sheets

HEAD DRUM ASSEMBLY

BACKGROUND OF THE INVENTION

1. Field of the Invention

The present invention relates to a head drum assembly, and more particularly to a novel head drum assembly having a simplified structure, and whose manufacturing and assembling are advantageous because a lower drum is integrally formed with a deck on which a running system of a tape is formed, and a shaft is integrally formed with a main chassis.

2. Description of the Prior Art

Generally, a magnetic recording/reproducing apparatus is an apparatus for recording an image and/or an audio signal onto a magnetic tape running along a running system or for reproducing recorded signals. The magnetic tape is wound around a pair of wheels provided in a cassette, and when the cassette is loaded into a deck of a tape recorder according to a loading mechanism, the pair of wheels are respectively mounted on a take-up reel table and a supply reel table installed on the deck. After completion of the installation, tape drawing members draw the tape from the cassette positioned at a loading place so that the tape contacts about a half of the circumference of the head drum. After that, a selected running operation, such as playing, recording, fast forwarding, rewinding, etc., is carried out. At this time, the magnetic tape is drawn out from a wheel and wound around the other wheel according to the rotational direction of the take-up reel table and the supply reel table.

Among the members constituting the magnetic recording/reproducing apparatus, since the rotary head drum directly participates in recording and reproducing signals, the rotary head drum needs to be highly reliable and stable. FIG. 1 is a partial cross-sectional view for showing in detail the structure of the conventional rotary head drum. The structure of the rotary head drum will be described in brief below.

An upper drum 11 has at least two video heads 15 for recording/reproducing information onto/from the tape. The two video heads 15 are positioned and held at the outer bottom portion of the upper drum 11 by means of screws. The upper drum 11 also has a rotor transformer 11a at the inner bottom portion thereof. The upper drum 11 is inserted into the upper end portion of a shaft 14.

Under the upper drum 11, a cylindrical lower drum 12 having a stator transformer 12a (corresponding to rotor transformer 11a) is installed on a drum base 18 (see FIG. 2). At the outer periphery of the lower drum 12, a lead line 20 for leading the magnetic tape is formed. Between the lower drum 12 and the shaft 14, an upper bearing 16a and a lower bearing 16b are inserted so as to receive a pre-load.

A motor 13 in a housing, for generating a driving force, is installed under the lower drum 12. The motor 13 includes a stator 13a, which is magnetized when a current is applied, and a rotor 13b. The rotor 13b consists of a ring-shaped magnet attached to the inner periphery of the housing and is positioned at a predetermined distance apart from the stator 13a in a radial direction thereof. The rotor 13b rotates by the electromagnetic force generated by a reaction of the rotor 13b with the stator 13a.

The upper drum 11 rotates in a predetermined direction by the rotation of shaft 14, which receives the driving force from the motor 13. The rotor transformer 11a installed at the inner bottom portion of the upper drum 11 and related in a non-contacting manner with the stator transformer 12a installed on the lower drum 12, also rotates with the upper drum 11 to transport the image signals received from the video heads 15 to the stator transformer 12a.

Rotary head drums are widely known. See for example U.S. Pat. Nos. 5,392,180 (issued to Hasegawa), 4,972,283 (issued to Kim), 4,930,030 (issued to Yabu et al.).

The rotary head drum is assembled on the deck. FIG. 2 is a perspective view of a head drum, a drum base on which the lower drum of the head drum is seated, and a deck, for showing the assembling method of the head drum on the deck.

First, the upper drum 11, the shaft 14 and the lower drum 12 are assembled to complete the head drum 10. The lower drum 12 of the head drum 10 is seated on the drum base 18, which is separately manufactured so as to have a predetermined inclination, and then the lower drum 12 is assembled using screws 18b. The lower drum 12 has the same inclination as the drum base 18, which is assembled on a deck 19 using screws 18a. After assembling, the head drum 10 is installed on the deck 19.

The lower drum of the head drum is generally formed by die casting. At this time, the surface of the lower drum is processed by a rough machining. Screw holes for assembling the head drum with the drum base are formed by a hole-making process of drilling and tapping. After the hole-making processing, the lead line is formed by a final machining. Then a washing process and a buffing process are carried out. The lower drum is seated on the drum base by means of screws, and then is seated on the deck by means of screws.

As described above, very detailed workings and complicated processes are needed to manufacture the lower drum. This increases the manufacturing cost. Moreover, an inclined drum base is needed to fix the lower drum on the deck. This increases the number of components. Further, since separate assembling processes are needed for assembling the lower drum to the drum base and for assembling the drum base to the deck, the entire assembling process is very complicated and therefore, the product yield is low.

SUMMARY OF THE INVENTION

To solve the problems of the conventional art, it is an object of the present invention to provide a novel head drum assembly whose manufacturing and assembling are advantageous and whose yield and productivity are increased.

To accomplish the object of the present invention, there is provided a head drum assembly of a magnetic recording/reproducing apparatus comprising a main chassis, a deck for forming a running system, and a main PCB (printed circuit board) for controlling various components of the magnetic recording/reproducing apparatus. The head drum assembly comprises an upper drum having at least two video heads at an outer bottom portion of the upper drum and a rotor transformer at an inner bottom portion of the upper drum. A lower drum is formed on a boss and under the upper drum and has a cylindrical shape with the same diameter as that of the upper drum. The boss is formed by bending the deck upwardly. A lead line for leading a magnetic tape is formed on an outer periphery of the lower drum. A stator transformer (corresponding to the rotor transformer) is formed on the main PCB. A shaft is located on the main chassis and is inserted into the upper drum. The upper drum is rotatable relative to the shaft. A motor rotates the upper drum relative to the shaft.

Particularly, the lower drum is integrally formed with the deck by means of an outsert molding and a lead line is formed during the outsert molding.

Further, a shielding member surrounds the rotor transformer and the stator transformer to shield a gap formed by the rotor transformer and the stator transformer. The shielding member is formed on the main PCB.

The shielding member may include a cylindrical fixing portion fixed on the main PCB by means of a screw, and a shielding portion bent upwardly from an inner portion of the cylindrical fixing portion. The shielding member can be made of a cylindrical shielding plate fixed on the main PCB by soldering.

The motor includes a rotor formed at an inner upper portion of the upper drum and a stator corresponding to the rotor and formed at a bottom portion of an upper pre-load boss, which is installed at an upper end portion of the shaft.

A lubricating means can be formed between the shaft and the upper drum for facilitating a rotation of the upper drum with respect to the shaft. Preferably, the lubricating means comprises an upper bearing and a lower bearing. More preferably, the shaft has a step for supporting the lower bearing.

A lower pre-load boss can be installed on the main PCB for supporting the lower bearing instead of forming the step.

The above object also can be accomplished by a head drum assembly comprising an upper drum having at least two video heads at an outer bottom portion thereof, a rotor transformer at an inner bottom portion of the upper drum, a lower drum formed under the upper drum and having a cylindrical shape with the same diameter as that of the upper drum, a lead line for leading a magnetic tape formed on an outer periphery of the lower drum, a shaft integral with a main chassis and inserted into the upper drum and the lower drum, a lubricating means located between the upper drum and the shaft for facilitating a rotation of the upper drum, and a motor for rotating the upper drum relative to the shaft.

Particularly, the lubricating means comprises an upper bearing and a lower bearing.

More preferably, the lower drum is integrally formed with the deck at an outer portion of a deck having an upwardly bent boss by means of an outsert molding, and a stator transformer corresponding to the rotor transformer is installed on a main PCB (printed circuit board) for controlling various components of the magnetic recording/reproducing apparatus. In this case, a shielding member for shielding a gap formed by the rotor transformer and the stator transformer is formed on the main PCB.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Hereinafter, the parts or elements and the operation principles of the head drum assembly according to preferred embodiments of the present invention will be explained in more detail with reference to the accompanying drawings.

Figure 1:
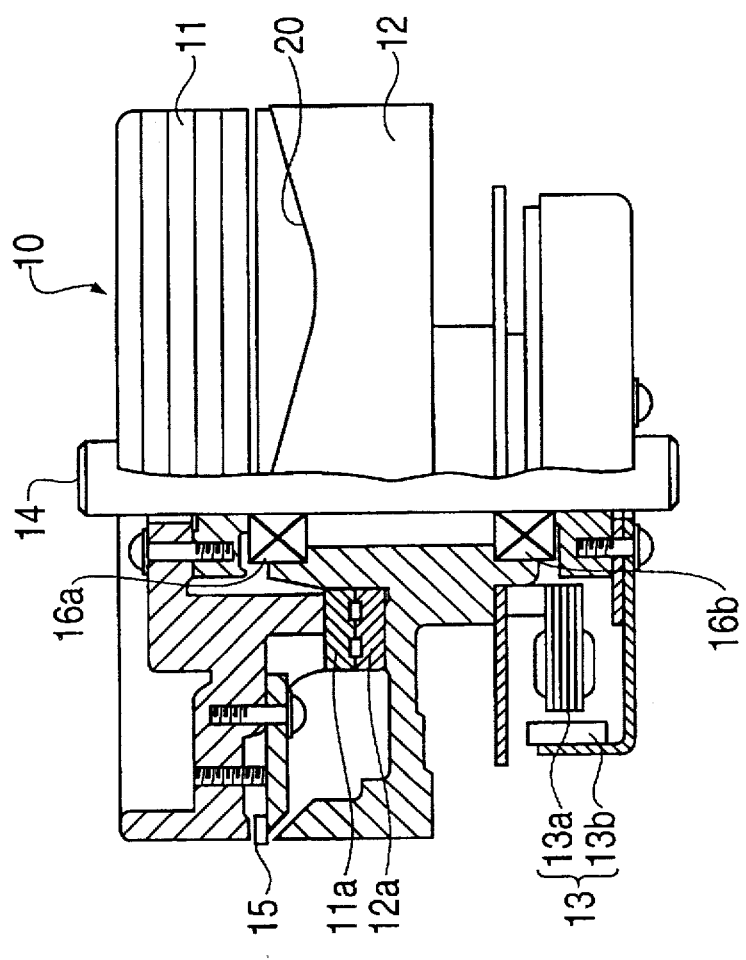
FIG. 1 is a partial sectional view and a partial front view of a rotary head drum applied to a conventional magnetic recording/reproducing apparatus.
Figure 2:
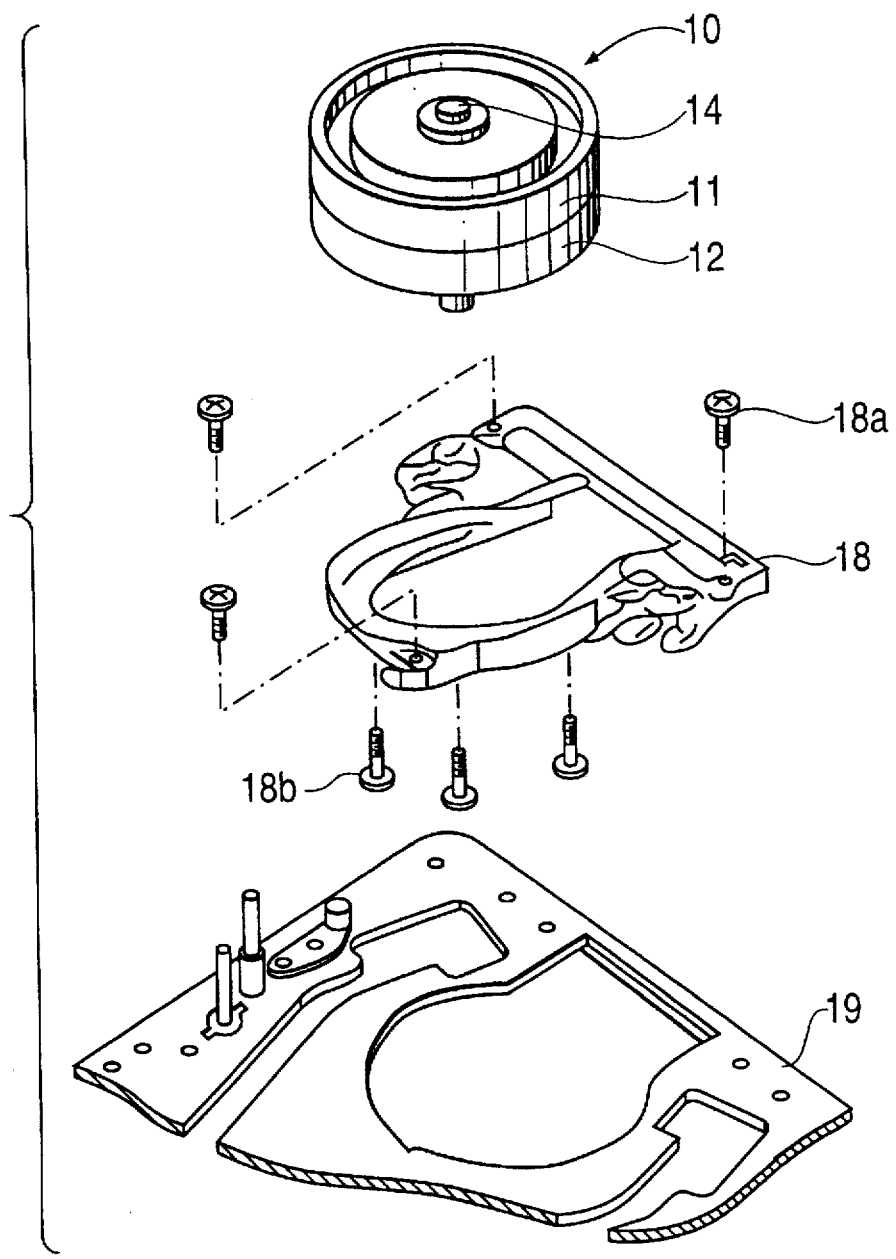
FIG. 2 is a partial exploded perspective view for showing the assembling method of the rotary head drum on a drum base and on a deck.
Figure 3:
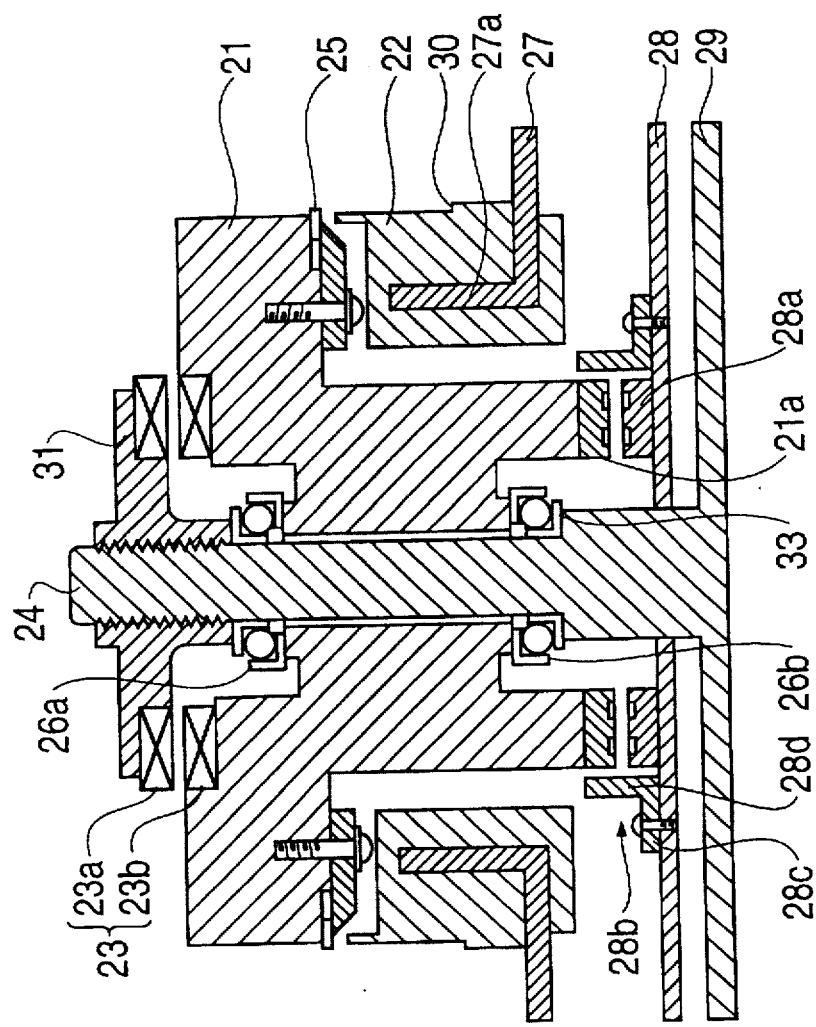
FIG. 3 is a head drum assembly according to an embodiment of the present invention.

FIG. 3 illustrates a head drum assembly according to an embodiment of the present invention. The head drum assembly mainly includes an upper drum 21 having video heads 25 fixed at the outer bottom portion of the upper drum 21 180 degrees apart from each other by means of screws. The assembly further includes a rotor transformer 21a at the inner bottom portion of the upper drum 21 and a lower drum 22 located under the upper drum 21 at the exterior portion of a boss 27a, which is formed by upwardly bending a deck 27. The lower drum has the same diameter as that of the upper drum 21. A shaft 24 is integrally formed with a main chassis 29 and is inserted into the upper drum 21 and the lower drum 22. The upper drum 21 is rotatable relative to the shaft 24. A motor 23 is installed at the upper portion of the upper drum 21. A stator transformer 28a (corresponding to rotor transformer 21a) is formed on a main PCB (printed circuit board) 28 for controlling various components. An upper bearing 26a and a lower bearing 26b are installed as a lubricating device between the shaft 24 and the upper drum 21.

Video heads 25 for recording/reproducing an information onto/from a magnetic tape are minutely protruded from the upper drum 21 and the lower drum 22, to read out image signals from a running magnetic tape making contact with an outer periphery of the head drum during the rotation of the upper drum.

The lower drum 22 is formed under the outer portion of the upper drum 21. A lead line 30 for leading the running of the magnetic tape is formed at the outer periphery of the lower drum 22. The lower drum 22 is formed at the exterior portion of the boss 27a, which is formed by upwardly bending the deck 27 by a press working. The lower drum 22 can be desirably formed by an outsert molding using an injection molding material, such as thermoplastics. The lead line 30 can be formed during the outsert molding using a fine metal molding or during a final machining after the outsert molding. The outsert molding is a method for molding a functional portion on a material, such as a metal plate, by injection molding.

When the lower drum 22 is formed on the deck 29 by the outsert molding using an injection molding material such as thermoplastics, the lower drum 22 does not need to be separately manufactured and does not need to be assembled on a drum base. Therefore, the manufacturing of screw holes is not needed. That is, a hole-making process can be omitted. Further, when the lead line 30 is formed during the outsert molding, the final machining for forming the lead line can also be omitted.

The stator transformer 28a, which corresponds to the rotor transformer 21a electrically connected with the video heads 25, is fixed on main PCB 28. The rotor transformer 21a receives image signals from the video heads 25 and transports the signals to the stator transformer 28a, which is related in a non-contacting manner with the rotor transformer 21a.

The shaft 24, which is combined with the upper drum 22 with the upper bearing 26a, penetrates the main PCB 28 and is fixed on the main chassis 29. The shaft 24 has a step 33 for giving a pre-load to the lower bearing 26b. Since the head drum is inclined to a predetermined degree, the shaft 24 should be manufactured to have an inclination in accordance with the inclination of the head drum.

At the upper portion of the shaft 24, an upper pre-load boss 31 is installed, for giving the pre-load to the upper bearing 26a. At the bottom portion of the upper pre-load boss 31, a stator 23a corresponding to the rotor 23b, which is installed at the inner upper portion of the upper drum 21, is installed.

In the head drum having the above described embodiment, when a current is applied to the stator 23a, which is part of the motor 23, the rotor 23b, which is positioned at the inner periphery of the upper drum 21 at a predetermined distance in the radial direction from the stator 23a, starts to rotate by the electromagnetic force generated by the rotor 23b and the stator 23a. When the rotor 23b rotates, the shaft 24, which is connected to the rotor 23b, starts to rotate, and the upper drum 21, into which the shaft 24 has been inserted by pressure, also starts to rotate. Then the video heads 25, which protrude minutely from the rotating upper drum 21 and the fixed lower drum 22, scans the signal tracks of a running tape one by one to record/reproduce an information onto/from the tape.

In the head drum assembly according to the above described embodiment of the present invention, the lower drum 22 can be advantageously manufactured. The lower drum 22 can be integrally formed with the deck 27 in a single step. Thus, it does not need to be separately manufactured and assembled on the deck 27. In addition, the shaft 24 is integrally formed with the main chassis 29. Therefore, the head drum can be assembled by merely assembling the upper drum 21 onto the shaft 24.

However, since the stator transformer 28a is fixed on the main PCB 28, on which various electronic components are concentrated, the noise generated from the electronic components might interfere with the signals output from the video heads and damage the image signals. To prevent this phenomenon, a shielding member 28b can be provided at the outer side of the transformers. The shielding member 28b includes a cylindrical fixing portion 28c, which is fixed on the main PCB 28 by means of a screw, and a shielding portion 28d, which has been upwardly bent from the fixing portion 28c. The shielding portion 28d covers the gap between the rotor transformer 21a and the stator transformer 28a so that the gap is not exposed to the exterior of the head drum.

The shielding member can be formed in any shape as long as the shielding member can shield the gap between the rotor transformer 21a and the stator transformer 28a from the exterior of the head drum. For example, the shielding member can be a cylindrical shielding plate. This plate can be fixed on the main PCB 28 by soldering.

Figure 4:
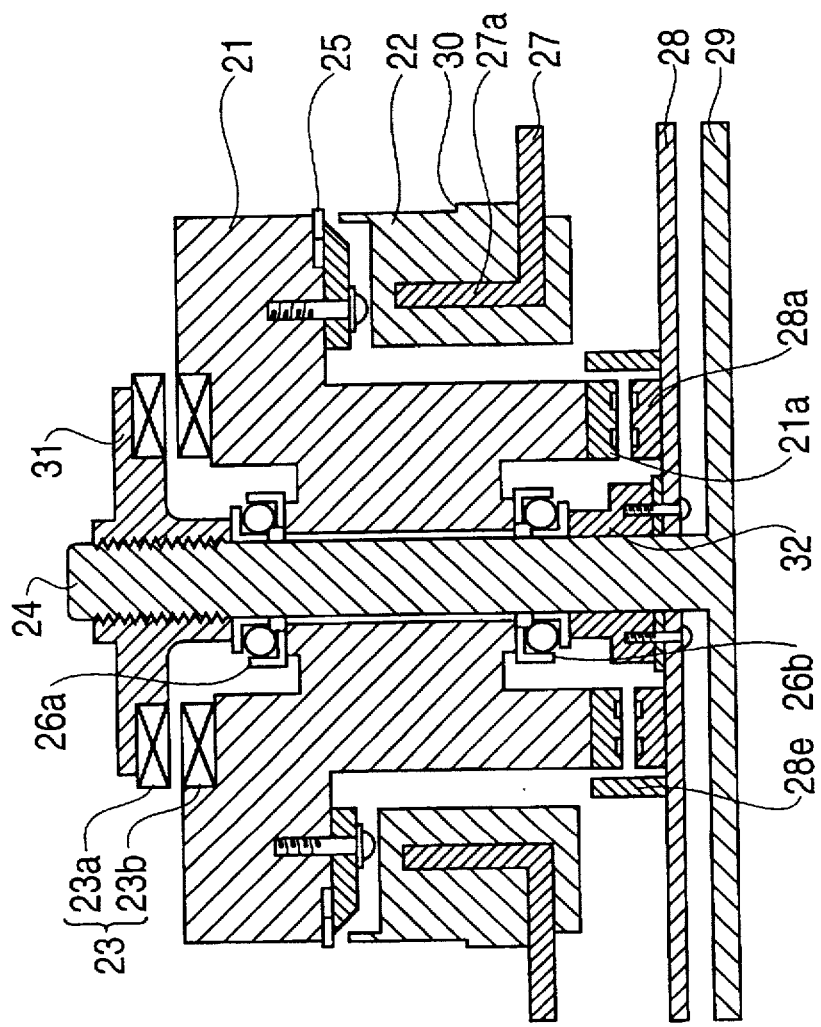
FIG. 4 is a head drum assembly according to another embodiment of the present invention.

The step 33 of the shaft 24 can be replaced with a lower pre-load boss. As another preferred embodiment of the present invention, a head drum assembly, including a shielding plate 28e and a lower pre-load boss 32, is illustrated in FIG. 4.

As described above, in the head drum assembly according to the present invention, since the lower drum can be advantageously formed on the deck by a single process, the manufacturing of the lower drum is simplified. In addition, since difficult processing techniques can be omitted, the manufacturing cost can be reduced. Particularly, the lower drum can be manufactured during a formation of molding objects for combining other components on the deck.

Further, since assembling processes of the drum base can be omitted, assembling is simplified. The reduction in the number of the constituting elements increases the production yield, and the reduction in defect ratio improves the quality of the product.

In addition, since the shaft is fixed on a predetermined position on the main chassis and since the lower drum can be formed during the formation of the molding objects for combining other components on the deck, the head drum assembly can be assembled by assembling the upper drum while giving an appropriate bearing pre-load to the upper drum.

If the lower drum is formed on the deck by the outsert molding according to the present invention, the manufacturing of the lower drum becomes very simple and the material cost can be reduced. Particularly, the manufacturing of the lower drum can be carried out when forming molding products for other components on the deck. Since the assembling process of the drum base can be omitted, the manufacturing is simplified and the manufacturing cost is reduced.

Since the lower drum is integrally formed with the deck, the conventional drum base is not needed. This reduces the number of components and assembling steps. Accordingly, the product yield can be increased and the ratio of defect can be decreased, improving the product quality.

Although the preferred embodiment of the invention has been described, it is understood that the present invention should not be limited to the preferred embodiment, but various changes and modifications can be made by one skilled in the art within the spirit and scope of the invention as hereinafter claimed.

What is claimed is:

1. A head drum assembly of a magnetic recording/reproducing apparatus having a main chassis, a deck of a tape-running system located above the main chassis, and a main located on the main chassis for controlling various components of said magnetic recording/reproducing apparatus, said head drum assembly comprising:

an upper drum having at least two video heads at an outer bottom portion of said upper drum and having a rotor transformer at an inner bottom portion of said upper drum;

a boss formed by bending said deck upwardly;

a lower drum formed on said boss and under said upper drum and having a cylindrical shape with a same diameter as that of said upper drum, and a lead line for leading a magnetic tape positioned on an outer periphery of said lower drum;

a stator transformer located on said main printed circuit board, said stator transformer corresponding to said rotor transformer;

a shaft integral with said main chassis, wherein said upper drum is rotatably mounted to said shaft; and a motor for rotating said upper drum relative to said shaft, wherein part of the motor is positioned on said upper drum.

2. A head drum assembly as claimed in claim 1, wherein said lower drum is formed on said deck by means of an outsert molding.

3. A head drum assembly as claimed in claim 2, wherein said lead line is formed during said outsert molding.

4. A head drum assembly as claimed in claim 1, further comprising a shielding member surrounding said rotor transformer and said stator transformer for shielding a gap formed by said rotor transformer and said stator transformer so that the gap is not exposed to an exterior of said head drum, wherein said shielding member is positioned on said main printed circuit board.

5. A head drum assembly as claimed in claim 4, wherein said shielding member comprises a cylindrical fixing portion fixed to said main printed circuit board by means of screws, and a shielding portion bent upwardly from an inner portion of said cylindrical fixing portion.

6. A head drum assembly as claimed in claim 4, wherein said shielding member comprises a cylindrical shielding plate fixed to said main printed circuit board by soldering.

7. A head drum assembly as claimed in claim 1, further comprising an upper pre-load boss mounted to an upper end portion of said shaft, wherein said motor comprises a rotor positioned at an inner upper portion of said upper drum and a stator positioned at a bottom portion of said upper pre-load boss.

8. A head drum assembly as claimed in claim 1, wherein a lubricating means is positioned between said shaft and said upper drum for facilitating rotation of said upper drum relative to said shaft.

9. A head drum assembly as claimed is claim 8, wherein said lubricating means comprises an upper bearing and a lower bearing.

10. A head drum assembly as claimed in claim 9, wherein said shaft has a step for supporting said lower bearing.

11. A head drum assembly as claimed in claim 9, further comprising a lower pre-load boss mounted to said main printed circuit board for supporting said lower bearing.

12. A head drum assembly comprising:

an upper drum having at least two video heads at an outer bottom portion of said upper drum and having a rotor transformer at an inner bottom portion of said upper drum;

a deck having an upwardly bent boss;

a lower drum positioned under said upper drum and having a cylindrical shape with a same diameter as that of said upper drum, a lead line for leading a magnetic tape being located on an outer periphery of said lower drum, said lower drum being integrally formed with said deck on said boss by means of an outsert molding;

a shaft integral with a main chassis of a magnetic recording/reproducing apparatus and having a step, wherein said upper drum is rotatably mounted to said shaft;

a lubricating means for facilitating rotation of said upper drum positioned between said upper drum and said shaft, wherein said lubricating means comprises an upper bearing and a lower bearing, said lower bearing being supported on said step; and a motor for rotating said upper drum relative to said shaft, wherein part of said motor is positioned on said upper drum.

13. A head drum assembly as claimed in claim 12, further comprising an upper pre-load boss mounted at an upper end portion of said shaft, wherein said motor comprises a rotor positioned at an inner upper portion of said upper drum and a stator positioned at a bottom portion of said upper pre-load boss.

14. A head drum assembly as claimed in claim 12, further comprising a stator transformer mounted to a main for controlling various components of said magnetic recording/reproducing apparatus.

15. A head drum assembly as claimed in claim 14, further comprising a shielding member surrounding said rotor transformer and said stator transformer for shielding a gap formed by said rotor transformer and said stator transformer so that the gap is not exposed to an exterior of said head drum, wherein said shielding member is mounted to said main printed circuit board.

* * * * *